(12) United States Patent
Adleff

(10) Patent No.: US 7,426,826 B2
(45) Date of Patent: Sep. 23, 2008

(54) HYDRODYNAMIC MACHINE, FOR EXAMPLE, HYDRODYNAMIC COUPLING OR HYDRODYNAMIC BRAKE

(75) Inventor: Kurt Adleff, Crailsheim (DE)

(73) Assignee: Voith Turbo GmbH & Co. KG., Heidenheim (DE)

(*) Notice: Subject to any disclaimer, the term of this patent is extended or adjusted under 35 U.S.C. 154(b) by 211 days.

(21) Appl. No.: 11/343,909

(22) Filed: Jan. 31, 2006

(65) Prior Publication Data
US 2006/0225412 A1    Oct. 12, 2006

(30) Foreign Application Priority Data
Jan. 31, 2005    (DE) .................. 10 2005 004 524

(51) Int. Cl.
*F16D 57/02*    (2006.01)
(52) U.S. Cl. .............. 60/330; 60/337; 60/351; 60/358
(58) Field of Classification Search ............ 60/330, 60/351, 357, 352, 358, 359, 337
See application file for complete search history.

(56) References Cited

U.S. PATENT DOCUMENTS

| | | | | |
|---|---|---|---|---|
| 2,873,831 A | * | 2/1959 | Sinclair | 60/360 |
| 3,405,524 A | * | 10/1968 | Marine | 60/337 |
| 3,581,502 A | | 6/1971 | Thylefors | 60/54 |
| 4,516,399 A | * | 5/1985 | Holler et al. | 60/351 |
| 4,671,061 A | * | 6/1987 | Elderton | 60/351 |
| 5,561,975 A | | 10/1996 | Gambini | 60/338 |
| 6,101,810 A | | 8/2000 | Adleff et al. | 60/337 |

FOREIGN PATENT DOCUMENTS

DE    195 21 926    1/1996
DE    196 14 589    10/1997

* cited by examiner

*Primary Examiner*—Igor Kershteyn
(74) *Attorney, Agent, or Firm*—Ohlandt, Greeley, Ruggiero & Perle, L.L.P.

(57) ABSTRACT

The invention concerns a hydrodynamic coupling or a hydrodynamic brake with the following features:
- having an impeller and a turbine wheel, which together form a toroidal working chamber;
- the impeller sits on a driveshaft, and the turbine wheel sits on a driven shaft;
- having a housing, which encloses the impeller and, together with the impeller, forms a retaining space, which is conductively connected to the working chamber;
- having an inlet and an outlet for the filling and emptying of the working chamber;
- the driveshaft supports a dynamic pressure pump, which projects into the retaining space and which can be placed in rotation around the driveshaft (20);
- the dynamic pressure pump has an inlet in its radial outer region and is connected to the outlet by its radial inner region;
- a connection that is resistant to rotation can be produced and/or released again selectively between the dynamic pressure pump and the driveshaft.

7 Claims, 2 Drawing Sheets

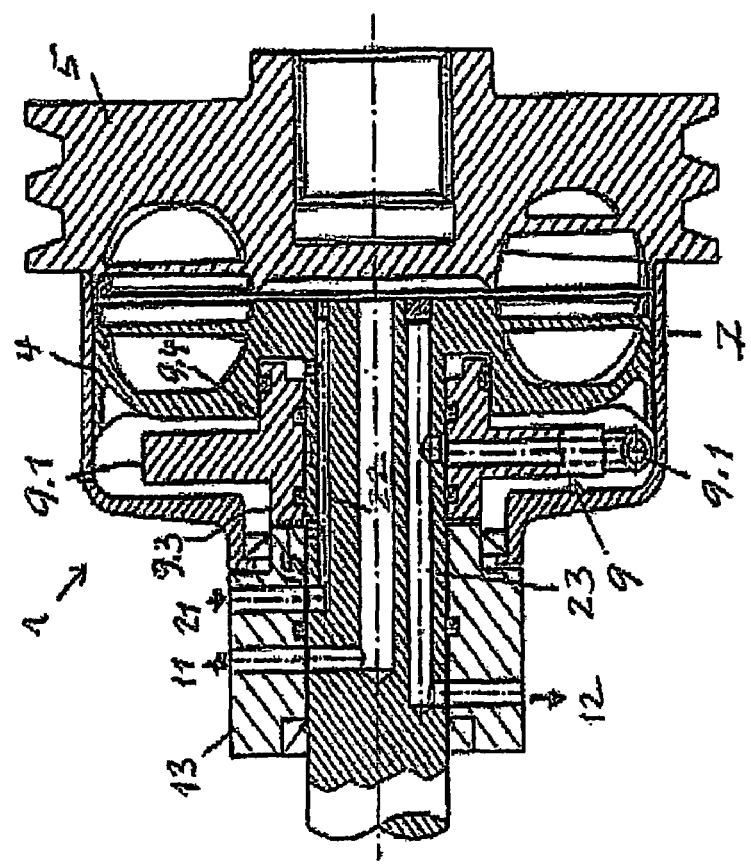
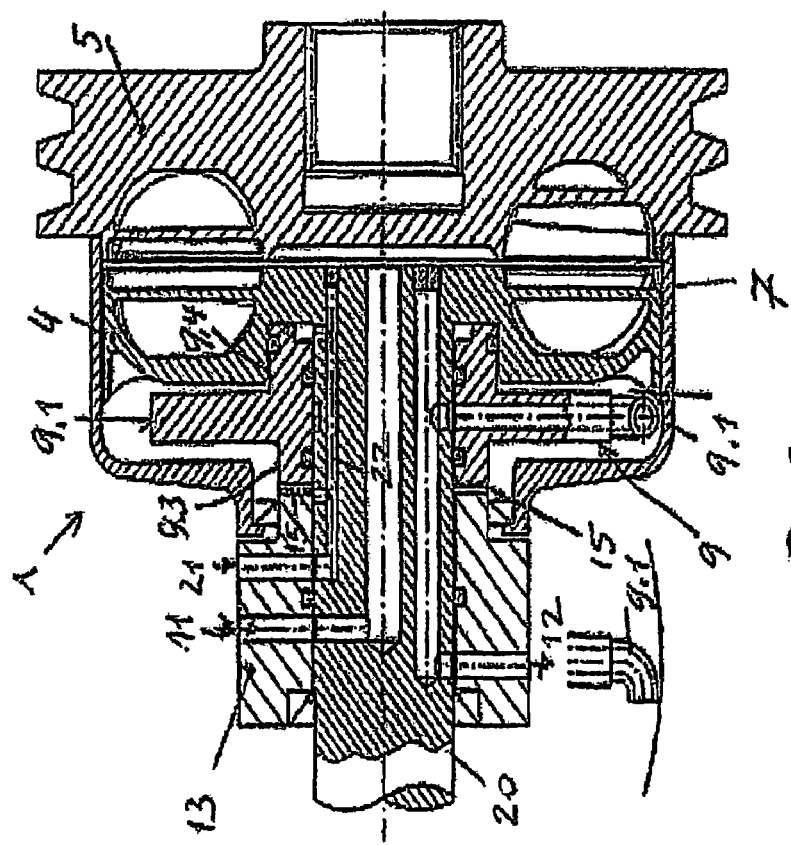

HYDRODYNAMIC MACHINE, FOR EXAMPLE, HYDRODYNAMIC COUPLING OR HYDRODYNAMIC BRAKE

BACKGROUND OF THE INVENTION

The invention concerns a hydrodynamic machine with an impeller and a turbine wheel, which together form a toroidal working chamber. Both a hydrodynamic coupling as well as a hydrodynamic brake (retarder) are considered here. The toroidal working chamber can be filled with a working medium. The working chamber has an inlet and an outlet for the working medium. The impeller is enclosed in a housing, which, together with the impeller, forms a retaining space. Retaining space and working chamber are conductively connected to one another. A dynamic pressure pump is found in the retaining space, which has a nozzle piece on its radial outer end for the uptake of working medium.

DE 196 14 589 A1 describes a hydrodynamic coupling of the named construction. Here, the dynamic pressure pump is disposed perpendicularly to the axis of the machine and is stationary at any time point. The radial inner end of the dynamic pressure pump is conductively connected to the working chamber. A turning valve, which can be actuated from outside is connected in the conductive connection.

SUMMARY OF THE INVENTION

The invention concerns any type of construction of hydrodynamic machines, in which the working chamber can be filled with working medium and can be emptied. The transmitted torque—the braking torque in the retarder and the driving torque in the coupling—can be adjusted by the selection of the degree of filling. In this way, filling and emptying can take place in the shortest possible time intervals. This applies particularly to retarders, while in couplings, in contrast, a delay may be desired. In each case, however, there is a complete emptying. The emptying will be carried out as completely as possible so that a residue of working medium no longer remains in the working chamber. If this is not the case, then there is the danger that the machine will still transmit torque. In the retarder, this means an undesired braking, and in the coupling, it means an undesired transmission of driving torque.

The object of the invention is to design a hydrodynamic machine of the structural type initially described, in particular, a coupling, in such a way that the working chamber can be largely or completely emptied, and to do this with as little structural complexity as possible.

The basic concept is to design and dispose the dynamic pressure pump in such a way that during the operation of the machine it rotates with the driveshaft of the impeller, thus with the transmission of torque, but stands still in the non-operating state. In contrast to all previously known structural types, the dynamic pressure pump is thus designed with a rotating movement around the axis of the machine when the working chamber is filled. Its rpm is thus equal or similar to the rpm of the driveshaft and thus of the impeller. Together with the impeller and the dynamic pressure pump, the working medium that is found therein, generally an oil, which is entrained as a ring, also rotates in the retaining space. Therefore, the dynamic pressure pump is practically placed out of operation. Working medium does not flow into the nozzle piece of the dynamic pressure pump, so that the dynamic pressure pump does not deliver it.

It delivers it again only when it is stationary and thus does not rotate. Then the liquid ring found namely in the retaining space rotates further and presses into the nozzle piece of the dynamic pressure pump. In this way, the machine is emptied of working medium.

There are various possibilities for placing the dynamic pressure pump in rotation, on the one hand, and for stopping the rotation of the dynamic pressure pump, on the other hand. The dynamic pressure pump can be constructed in different ways. It may comprise a pipe support, for example. However, it may also comprise a disk, which has one or more radially running channels.

The dynamic pressure pump is usually entrained by the oil found in the coupling circuit. It may be of advantage to actively cause the dynamic pressure pump to rotate by making it resistant to rotation with the driveshaft or with the impeller. This can be accomplished, for example, by pneumatic or hydraulic compression against the jacket surface of the driveshaft or against an end face of the impeller. Releasing it is conducted in the same way.

The invention can be used particularly advantageously with small couplings. In this case, a housing that encloses the coupling parts along with their complicated mechanical adjusting elements can be omitted. The invention can be applied ideally in drive systems comprising an engine, for example, a combustion engine, and a driven machine, for example, a marine screw propeller or a pump, or also a fan. In this case, the engine will drive the driven machine in a continual manner, while it will drive the fan only at certain times.

The advantages of the invention can be enumerated as follows:

No additional housing is necessary;
It can be directly built into drive elements (e.g., fan blades, pulleys, etc.);
There are no components that are moved linearly;
Rotationally symmetrical components;
Optimal emptying behavior, since there is no dependence on filling;
The friction lining is only loaded by the disk friction on the dynamic pressure pump support and the flow resistance at the dynamic pressure pump. No loading in nominal operation;
Reliable in operation, since the passage of cooling oil is possible even when control pressure is absent, i.e., with the co-rotating dynamic pressure pump;
Function is possible with external and internal wheel drive;
Minimum torque for the drive start up is adjustable;
Minimal torque (degree of filling) for the rotating drive can be preset by radial positioning of the dynamic pressure pump;
Short switching times of the friction brake have only a minimal effect on the drive (no mass acceleration, only buildup of disk friction).

The following application possibilities are conceivable among others:

Switch coupling for a fan drive;
Switch coupling for a cooling compressor;
Switch coupling for a compressor drive;
Switch coupling for a turbo-compound drive.

BRIEF DESCRIPTION OF THE SEVERAL VIEWS OF THE DRAWINGS

The invention is explained in more detail with reference to the drawing. Therein, the following are shown individually:

FIG. 3 shows a concrete embodiment of a hydrodynamic coupling analogous to FIG. 1.

FIG. 4 shows the subject of FIG. 3 analogous to FIG. 2.

DETAILED DESCRIPTION OF THE INVENTION

Figure 1:
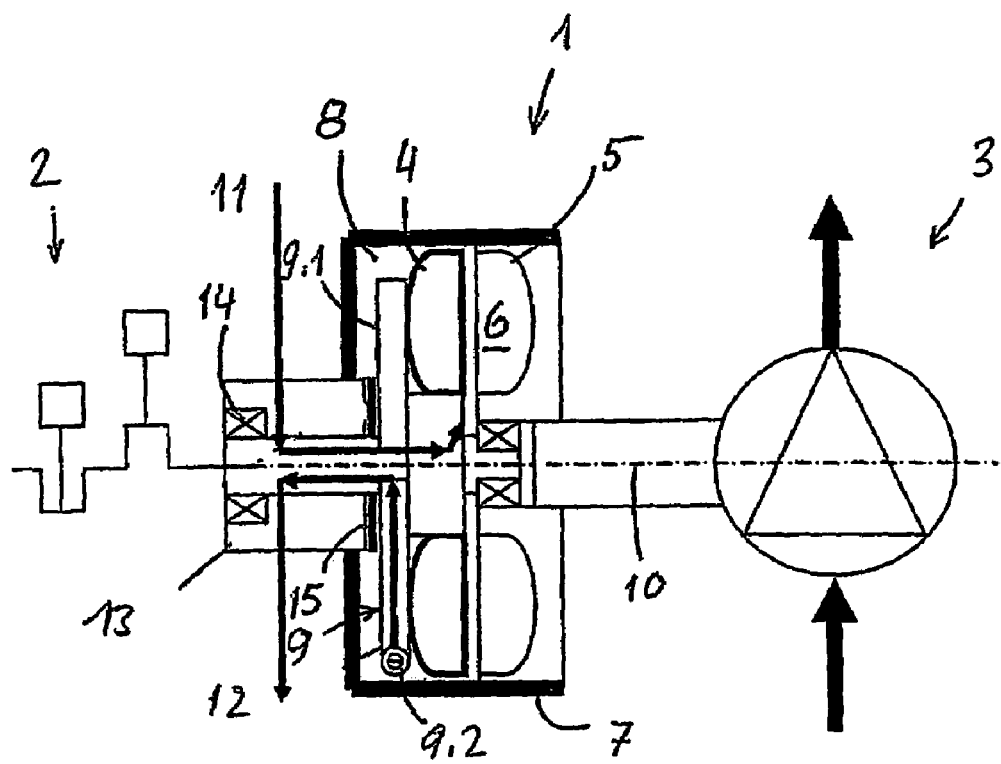
FIG. 1 shows, in a schematic representation, a hydrodynamic coupling in turned-on state in an axial segment.
Figure 2:
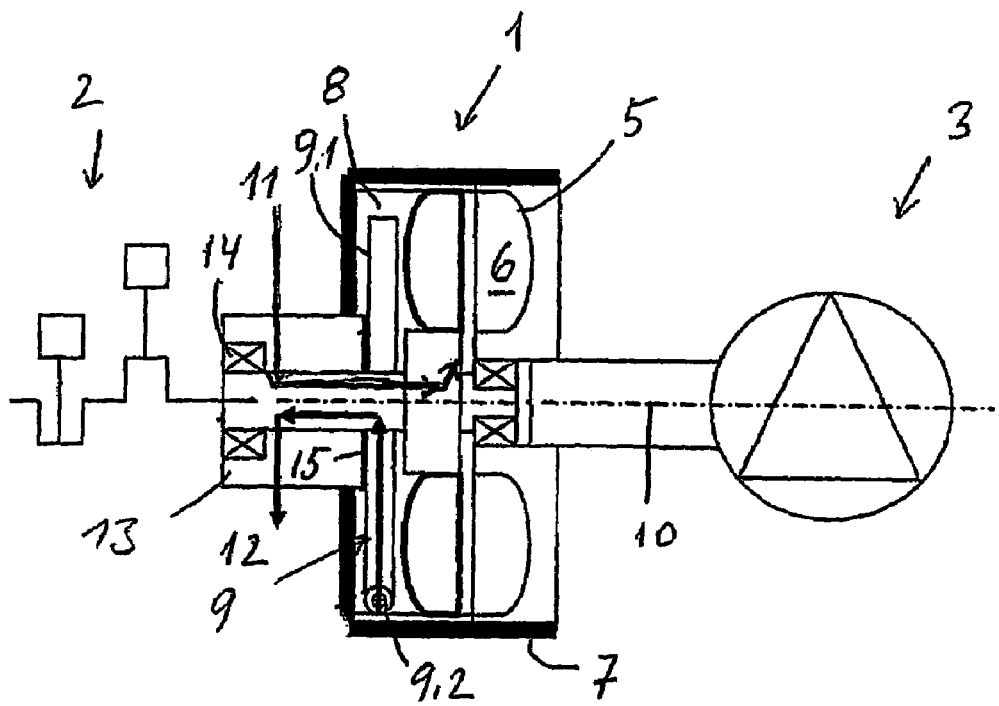
FIG. 2 shows the subject of FIG. 1 in a turned-off state.

The hydrodynamic coupling shown in FIGS. 1 and 2 is a component of a drivetrain. The drivetrain comprises an engine 2 and a driven machine 3, e.g., a pump. The coupling has an impeller 4 as well as a turbine wheel 5. The two wheels are provided with blades in the known way. They form in common a toroidal working chamber 6. The chamber can be filled with a medium, in general with an oil, and emptied.

A housing 7 is provided. The latter envelops the impeller 4 as well as a part of the turbine wheel 5. It encloses a retaining space 8 together with impeller 4. Retaining space 8 is conductively connected to working chamber 6.

An essential component of the hydrodynamic coupling according to the invention is a dynamic pressure pump 9. The latter is known in and of itself. In turn, it comprises a disk 9.1. This disk is disposed coaxially to machine axis 10. The disk has a bore extending in the radial direction. It has a nozzle piece 9.2 on its radial outer end.

Coupling 1 comprises an inlet 11 for introduction of working medium into working chamber 6, as well as an outlet 12 for discharge of the working medium. One considers the depicted flow paths of the working medium, which are provided with arrows. As can be seen, working medium passes through inlet 11 into a radial inner region of the coupling and from there to working chamber 6. The medium passes from a radial outer region of the working chamber 6 to nozzle piece 9.2 of the dynamic pressure pump, flows inwardly from there in the radial direction and finally reaches outlet 12.

Preferably, a cooling device as well as a storage tank with valves are connected between inlet 11 and outlet 12. These are not shown here, however. The quantity of working medium that flows in and flows out is generally made such that the coupling 1 is continually filled during operation and also that the necessary cooling is achieved.

For the case shown in FIG. 1, the coupling is turned on, as mentioned above. The working chamber 6, and likewise retaining space 8, is filled with working medium. The dynamic pressure pump 9 can freely rotate. It generally rests on the driveshaft that is not depicted in more detail here. It can be freely rotated on the driveshaft. Since the retaining space 8 is filled with working medium, the dynamic pressure pump 9 will be entrained by the working medium. The dynamic pressure pump 9 thus assumes the same rpm and direction of rotation as impeller 4, at least approximately. Therefore, it does not actively contribute to the transport of working medium from the retaining space 8 and thus also from the working chamber 6. The radial bore contained in disk 9.1 thus serves only for introducing working medium, if there is a certain pressure of working medium on the inlet.

If engine 2 is running in the state which is shown, then the impeller 4 of coupling 1 will be driven. Turbine wheel 5 is entrained and drives fan 3.

A stationary housing part 13 can be recognized in FIGS. 1 and 2. Opposite this housing part the housing 7 is sealed in a rotatable manner. Housing part 13 comprises a bearing 14. A friction disk 15 is attached to the front side of housing part 13. A gap remains between friction disk 15 and disk 9.1 of dynamic pressure pump 9, so that these two components do not stand in contact with one another. A contact connection, however, can be produced between disk 9.1 and impeller 4. This connection can be achieved pneumatically or hydraulically, for example by a control pressure line, which operates on the friction disk from left to right in the figure, so that friction disk 15 is pressed against impeller 4 and thus a friction entrainment is produced. It is therefore possible to produce a rotation-resistant coupling with disk 9.1 of dynamic pressure pump 9 and the driveshaft in the axial position shown, so that dynamic pressure pump 9 does not just rotate due to the working medium circulating in retaining space 8, but is positively entrained.

It is also conceivable to provide a spring, which is not shown here, which continually excercises a thrust in the axial direction onto disk 9.1, so that the latter is pressed against impeller 4.

In the state shown in FIG. 2, the dynamic pressure pump 9, i.e., its friction disk 9.1, is pressed against friction disk 15. Pressing can be conducted, for example, pneumatically or hydraulically, by means of a corresponding control device, with lines for control medium which are passed through the driveshaft. Pressing disk 9.1 against the friction disk 15 leads to a standing still of dynamic pressure pump 9. Dynamic pressure pump 9 thus no longer rotates. This has as a consequence the following definitive course:

At first, coupling 1 is still rotating. Now, however, working medium passes from the radial outer part of working chamber 6 to nozzle piece 9.2 of the stationary dynamic pressure pump 9 and from there to outlet 12. The introduction of working medium into inlet 11 can be blocked first. The coupling is very rapidly emptied via the dynamic pressure pump in the direction indicated by the arrows, and, in fact, is completely emptied. If coupling 1 is emptied, then also it can no longer transmit torque. The driven machine, i.e., pump 3 in the present case, shuts down.

FIGS. 3 and 4 illustrate the invention based on a concrete example of embodiment. Here, turbine wheel 3* forms a structural unit with a V-belt disk. Dynamic pressure pump 9 can be moved axially on driveshaft 20 between the positions shown in FIG. 3 and FIG. 4.

Here, dynamic pressure pump 2** comprises flanges 9.3 and 9.4 which are found on either side of disk 9.1. These flanges are found directly on driveshaft 20. As can be seen, flange 9.4, which is found closer to impeller 4, has a larger diameter than flange 9.3. Due to this circumstance and with respect to the pressure prevailing in retaining space 8, a thrust operates on disk 9.1 in the direction of impeller 4. The dynamic pressure pump is thus moved into the position shown in FIG. 3.

A control device is provided that comprises a source of oil for the control pressure, which is not shown here, a control oil inlet 21 as well as bores 22 provided in driveshaft 20.

In this way, the dynamic pressure pump 9 can be moved axially from the position according to FIG. 3 into the position according to FIG. 4. Flange 9.3 is then applied to friction disk 15.

In the operation of hydrodynamic coupling 1, working medium (for example, oil) flows into inlet 11 through a corresponding bore in housing part 13, and flows out again through outlet 12. The working chamber 6 of the coupling is then filled. Control oil is not introduced into inlet 21.

In the state shown in FIG. 4, the dynamic pressure pump 9 shuts down, thus no longer rotates. It is found in the standby position. For this purpose, control oil is introduced into inlet 21, so that the dynamic pressure pump assumes the position shown in FIG. 4 and is applied with pressure to friction disk 15. Working medium is no longer introduced into inlet 11. The working medium flows out from working chamber 6 to nozzle piece 9.1 of the dynamic pressure pump, then radially through the dynamic pressure pump inwardly into a corresponding bore 23, and from there to outlet 12.

In order to make the dynamic pressure pump 9 resistant to rotation with driveshaft 20, there are also possibilities other than those mentioned above. Thus, for example, a chamber can be provided, which can be connected to a medium under pressure, and is found between the radial inner region of dynamic pressure pump 9 and the jacket surface of driveshaft 20. The chamber can be formed from a double-band type of flexible tubing. If dynamic pressure pump 9 is to be made resistant to rotation with driveshaft 20, then a medium under pressure is introduced onto the chamber.

LIST OF REFERENCE NUMBERS

1 Hydrodynamic coupling
2 Engine
3 Driven machine
4 Impeller
5 Turbine wheel
6 Working chamber
7 Housing
8 Retaining space
9 Dynamic pressure pump
9.1 Disk
9.2 Nozzle piece
9.3 Flange
9.4 Flange
10 Coupling axis
11 Inlet
12 Outlet
13 Housing part
14 Bearing
15 Friction ring*
20 Driveshaft
21 Oil under pressure
22 Channel for oil under pressure
23 Channel for medium under pressure

The invention claimed is:

1. A hydrodynamic coupling or a hydrodynamic brake comprising:
   a pump impeller and a turbine wheel, which together form a torus-shaped working chamber, the pump impeller being seated on a drive shaft, and the turbine wheel being seated on a driven shaft;
   a shell that surrounds the pump impeller, the shell and the pump impeller forming a back-pressure chamber, which is in conveying connection with the torus-shaped working chamber;
   an inflow and an outflow for filling and draining the torus-shaped working chamber,
   wherein the drive shaft bears a back-pressure pump, which projects into the back-pressure chamber and which can be set in rotation around the drive shaft,
   wherein the back-pressure pump has an inlet in a radially outer region, wherein the back-pressure pump has a radially inner region that is joined to the outflow, and
   wherein the back-pressure pump and the drive shaft have a rotationally rigid connection therebetween, the rotationally rigid connection can be selectively made and/or released.

2. The hydrodynamic coupling or the hydrodynamic brake according to claim 1, wherein the back-pressure pump is in a stand-by position when engaged with a housing part or bearing part that is fixed in place.

3. The hydrodynamic coupling or the hydrodynamic brake according to claim 1, further comprising a hydrodynamic or pneumatic control device for shifting an axial position of the back-pressure pump, wherein the hydrodynamic or pneumatic control device comprises a source of a pressure medium and a channel for control medium in the drive shaft.

4. The hydrodynamic coupling or the hydrodynamic brake according to claim 1, wherein the back-pressure pump can be brought into force-locking engagement with the drive shaft or with the pump impeller to attain an operating position.

5. The hydrodynamic coupling or the hydrodynamic brake according to claim 1, further comprising
   a chamber between the radially inner region of the back-pressure pump and the drive shaft that is connected to a pressure medium, wherein the chamber can be pressurized with the pressure medium to produce a rotationally rigid connection between the back-pressure pump and the drive shaft.

6. The hydrodynamic coupling or the hydrodynamic brake according to claim 1, further comprising an actuator that constantly impinges on the back-pressure pump to shift the back-pressure pump into an operating position.

7. The hydrodynamic coupling or the hydrodynamic brake according to claim 6, wherein the actuator is a spring.

* * * * *

UNITED STATES PATENT AND TRADEMARK OFFICE
Certificate

Patent No. 7,426,826 B2                                                       Patented: September 23, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kurt Adleff, Crailsheim (DE); and Dr. Achim Menne, Crailsheim (DE).

Signed and Sealed this Twenty-Second Day of September 2009.

EDWARD LOOK
                                                            *Supervisory Patent Examiner*
                                                                        Art Unit 3745